United States Patent [19]
Yao et al.

[11] Patent Number: 6,112,582
[45] Date of Patent: Sep. 5, 2000

[54] GLIDE HEAD APPARATUS FOR TESTING RECORDING MEDIA

[75] Inventors: Wei H. Yao; Ramesh Sundaram, both of Fremont, Calif.

[73] Assignee: Seagate Technology, Inc., Scotts Valley, Calif.

[21] Appl. No.: 09/252,889

[22] Filed: Feb. 18, 1999

Related U.S. Application Data

[60] Provisional application No. 60/082,230, Apr. 16, 1998.

[51] Int. Cl.$^7$ ...................................................... G01B 5/28
[52] U.S. Cl. .............................................................. 73/105
[58] Field of Search ................................................ 73/105

[56] References Cited

U.S. PATENT DOCUMENTS

| | | |
|---|---|---|
| 4,624,564 | 11/1986 | Dahlgren . |
| 4,862,029 | 8/1989 | Kasai et al. . |
| 5,229,951 | 7/1993 | Sugita et al. . |
| 5,293,094 | 3/1994 | Flynn et al. . |
| 5,475,488 | 12/1995 | Fukuzawa et al. . |
| 5,612,841 | 3/1997 | Johnson . |
| 5,638,234 | 6/1997 | Hagen . |
| 5,689,064 | 11/1997 | Kennedy et al. ........................ 73/105 |
| 5,701,218 | 12/1997 | Boutaghou . |
| 5,703,684 | 12/1997 | Lu et al. . |
| 5,711,063 | 1/1998 | Budde et al. . |
| 5,757,492 | 5/1998 | Tokutomi et al. . |
| 5,774,305 | 6/1998 | Boutaghou . |
| 5,781,378 | 7/1998 | Heitkamp et al. . |
| 5,796,556 | 8/1998 | Boutaghou . |
| 5,808,184 | 9/1998 | Boutaghou et al. ...................... 73/105 |
| 5,824,920 | 10/1998 | Sugimoto et al. . |

OTHER PUBLICATIONS

Marchon et al., "Glide Avalanche Prediction From Surface Topography", Transactions of the ASME, vol. 118, Jul. 1996, pp. 644–650.

Kuo et al., "Design of Laser Zone Texture for Low Glide Media", IEEE Transactions on Magnetics, vol. 32, No. 5, Sep. 1996, pp. 3753–3758.

*Primary Examiner*—Robert Raevis
*Attorney, Agent, or Firm*—Fish & Richardson P.C.

[57] ABSTRACT

A glide head that can be coupled to a mounting base via a load arm includes a gimbal. A slider is coupled to the gimbal and includes an air bearing surface having a downward protrusion. The distance between the protrusion and a disc under test is substantially insensitive to changes in a height measured from a bottom of the mounting base to an upper surface of the disc. Furthermore, the protrusion can have a distal end extending downward such that a distance from the distal end to the disc under test is less than a distance from every other surface of the slider to the disc during operation of the glide head. The glide head can have a fly height that is substantially constant. Therefore, the glide head can provide more accurate and more uniform detection of outwardly projecting defects on the surface of the disc.

17 Claims, 5 Drawing Sheets

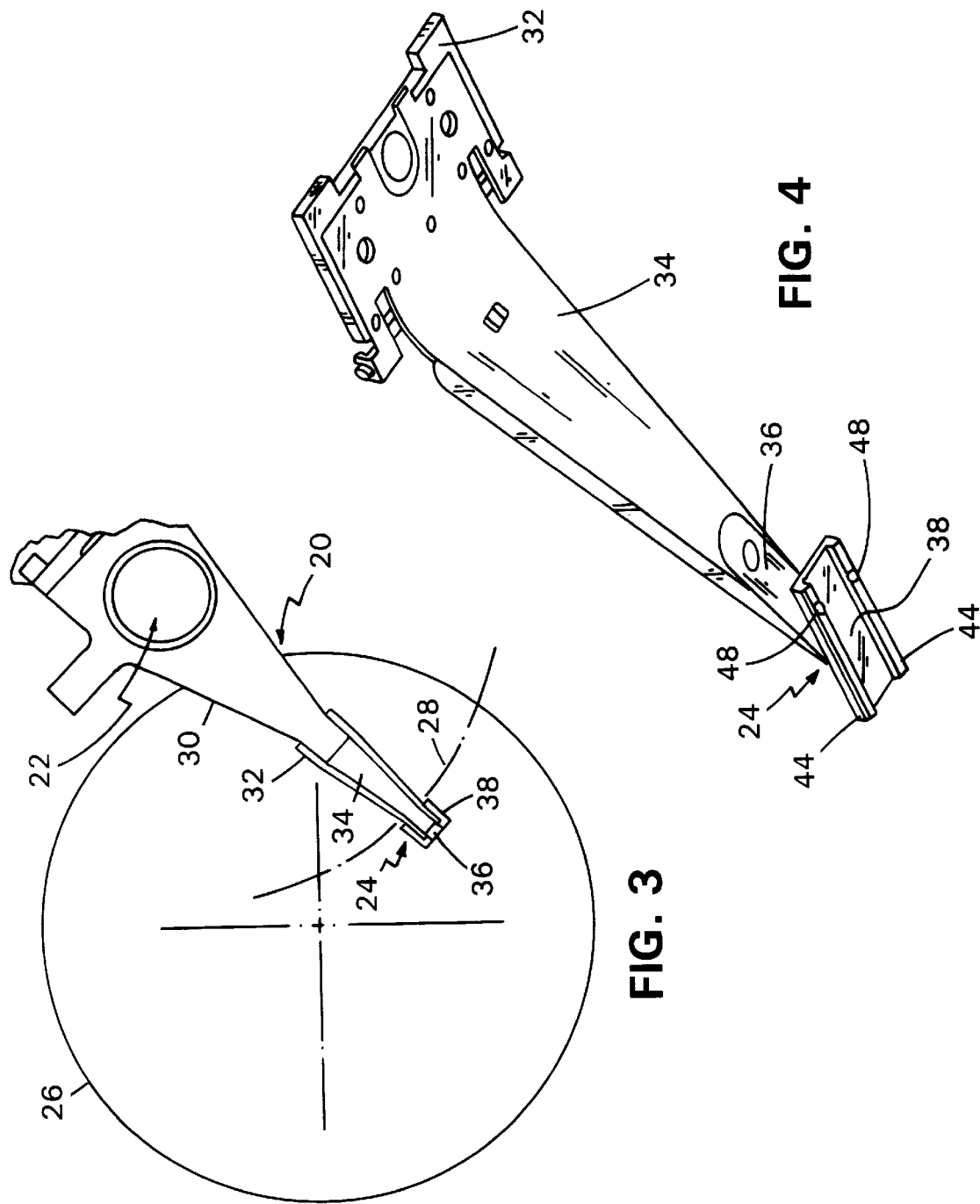

GLIDE HEAD APPARATUS FOR TESTING RECORDING MEDIA

CROSS REFERENCE TO RELATED APPLICATIONS

This application claims the priority of U.S. Provisional Application Ser. No. 60/082,230, filed Apr. 16, 1998. This application is related to a concurrently-filed application U.S. Ser. No. 09/252,263 entitled "Glide Head Testing Using A Glide Head Apparatus With A Piezoelectric Actuator," assigned to the assignee of the present invention and incorporated herein by reference in its entirety.

BACKGROUND

The present invention relates generally to magnetic recording media and, in particular, to apparatus and techniques for testing the glide height characteristics of magnetic recording media.

Disc drives are the primary devices used for mass storage of computer programs and data. Within a disc drive, a load beam supports a hydrodynamic air bearing slider close to a rotating magnetic disc. The load beam supplies a downward force that counteracts the hydrodynamic lifting force developed by the slider's air bearing. A gliding action is brought about as a layer of air, dragged along by the spinning disc surface, is compressed between the surface of the disc and the adjacent surface of the magnetic head. As a result of the gliding action, the magnetic head rides at a distance from an adjacent magnetic disc surface. That distance must be small enough to allow high density recording while preventing damage that would otherwise be caused by contact between the spinning disc and the magnetic head.

High a real densities currently are achieved by lowering the separation between the disc and the head to less than twenty nanometers (nm). However, some level of disc roughness is required to reduce adhesive forces when the head is at rest. The level of disc surface topography must, therefore, be kept within a tight range to fly the head safely at low altitudes while simultaneously preventing it from sticking to the disc surface when the head is at rest. The topography of the disc surface is, therefore, critical to the proper operation of the disc drive.

As part of the process of manufacturing hard files, the quality of a magnetic disc 10 is provided by determining the glide conditions which can be established between the disc and a glide head 12 (FIG. 1). In particular, the effect of outwardly projecting defects on the surface of the magnetic disc is studied during glide height testing. When such defects are large enough to close the gap between the magnetic disc and the glide head, the defects strike the glide head. The movement of the glide head can be sensed, for example, by a piezoelectric transducer, which generates an electrical signal indicating the adjacent passage of an outwardly projecting defect.

The distance "h" measured from lower surface 14 of the glide head 12 to the upper surface of the rotating rigid disc 10 is known as the "fly" height. The "fly" height of a glide head is critical to the accurate performance of glide tests and depends, among other things, on the "Z" height. The "Z" height" is the distance from the bottom of the mounting base 16 for the glide head 12 to the upper surface of the glide disc 10. The glide head 12 is coupled to the mounting base 16 by a load arm 18. As illustrated by FIG. 2, variations in the "Z" height can cause significant, and unacceptably large, changes in the "fly" height. Such variations in the "Z" height can occur, for example, as a result of movement of the mounting base 16 and make it difficult to ensure the accuracy and uniformity of "Z" height settings for different glide testers. Moreover, variations in the "fly" height for glide heads can result in the false reporting of defects or in the failure to detect defects on the disc surface.

Accordingly, improvements in glide heads are desirable to provide better accuracy in the detection of defects on the surface of discs.

SUMMARY

In general, according to one aspect, a glide head for testing surface characteristics of a magnetic disc includes means for providing a fly height which is substantially insensitive to changes in the "Z" height.

In one implementation, a glide head that can be coupled to a mounting base via a load arm includes a gimbal. A slider is coupled to the gimbal and includes an air bearing surface having a downward protrusion. The distance between the protrusion and a disc under test is substantially insensitive to changes in a height measured from a bottom of the mounting base to an upper surface of the disc. Furthermore, the protrusion can have a distal end extending downward such that a distance from the distal end to the disc under test is less than a distance from every other surface of the slider to the disc during operation of the glide head. The glide head can, therefore, have a fly height that is substantially constant. In particular, the glide head can be used, for example, to detect outwardly projecting defects on the surface of the disc.

According to another aspect, an apparatus for testing surface characteristics of a magnetic disc includes a mounting base and a slider having an air bearing surface. The air bearing surface has a downward protrusion whose distance from a disc under test is substantially insensitive to changes in a height measured from a bottom of the mounting base to an upper surface of the disc. The apparatus further includes a load arm which is coupled to the mounting base and which is compliant in a vertical axis to allow the slider to follow a topology of the disc. A gimbal is coupled to the load arm and resiliently supporting the slider. The apparatus includes a transducer for generating an electric signal when the protrusion strikes an asperity on the disc.

Various implementations include one or more of the following features. The slider can have a center of rotation with the protrusion located to one side of the center of rotation and a load point of the gimbal located to another side of the center of rotation. The protrusion can be formed of various materials, including a diamond-like carbon material or an aluminum-titanium-carbide. An outer protective layer comprising carbon can be provided on the protrusion.

In some implementations, the slider includes multiple rails extending along its lower surface. Each of the rails has a downward protrusion whose distance from the disc under test is substantially insensitive to changes in the "Z" height of the apparatus.

Various embodiments include one or more of the following advantages. Providing protrusions on the air bearing surface of the glide head can allow glide tests and glide avalanche tests to be performed more accurately because the disc can be tested while rotating at a higher linear velocity, thus resulting in an improved signal-to-noise ratio. Furthermore, by appropriately selecting the location of the protrusion, the fly height can be made substantially constant and relatively insensitive to changes in the "Z" height. Therefore, even if the mounting base to which the glide head is coupled moves slightly, there will be little or no change in the fly height. Similarly, if one glide head is replaced by a second glide head during testing of magnetic discs, any differences in the respective "Z" heights of the glide heads will have little impact on their respective fly heights, thereby allowing more uniform testing to be performed.

Other features and advantages will be readily apparent from the following detailed description, the accompanying drawings, and the claims.

BRIEF DESCRIPTION OF THE DRAWINGS

FIG. 3 is a plan view of a load arm supporting a head gimbal assembly embodying the present invention.

FIG. 4 is a perspective view of the load arm and head gimbal assembly of FIG. 3.

DETAILED DESCRIPTION

Figure 1:
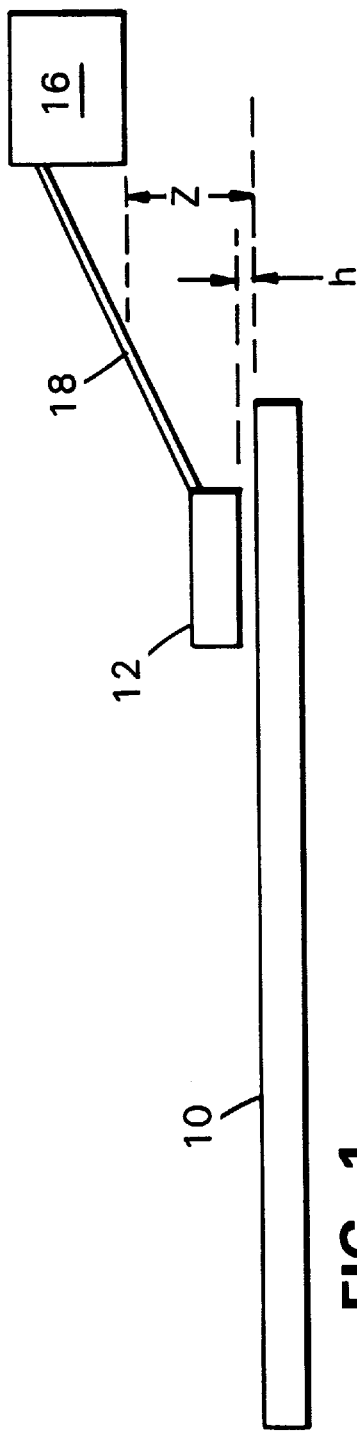
FIG. 1 illustrates various dimensions associated with a glide head for magnetic discs.
Figure 2:
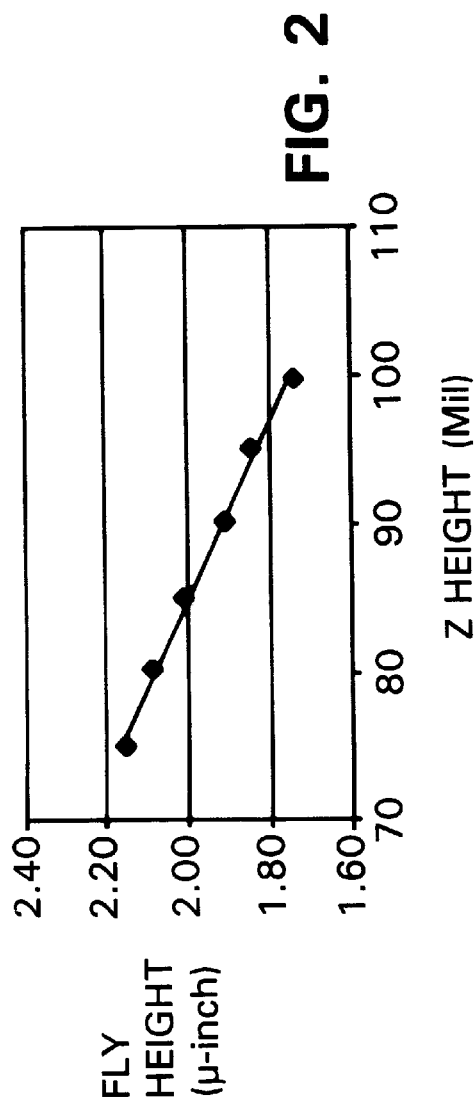
FIG. 2 is a graph showing exemplary values of "Z" height versus "fly" height for a prior art glide head.

Referring to FIGS. 3 and 4, an actuator arm 20 is connected to an actuator 22 and supports a head gimbal assembly (HGA) 24 over a magnetic disc 26. The actuator 22 positions the arm 20 along an arc 28 over the magnetic disc 26. The arm 20 includes a supporting arm 30, a base plate 32, and a load arm 34. The HGA or glide head 24 includes a gimbal 36 and a slider 38. The actuator 22 rotates the arm 20 to position the slider 38 along the arc 28.

Figure 5:
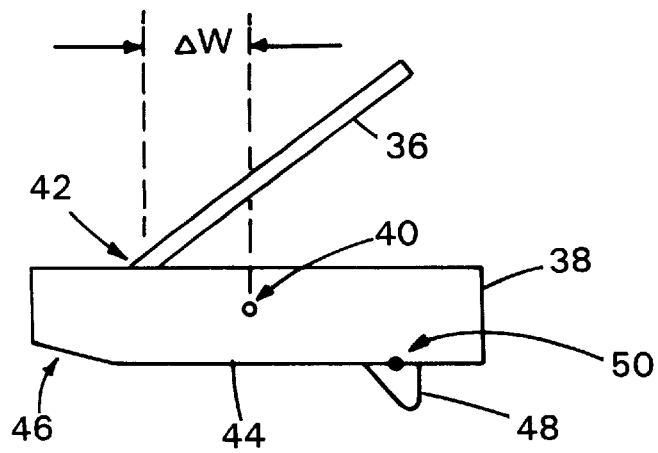
FIGS. 5 through 10 illustrate further features and details of a glide head according to the invention.

The gimbal 36 resiliently supports the slider 38 and allows it to pitch and roll while it follows the topography of the rotating disc 26. The gimbal 36 is welded to the load arm 34 and is connected to the slider 38 by an adhesive. As illustrated in FIG. 5, the offset Δw from the slider's center of rotation 40 to the gimbal load point 42 is positive. In other words, the gimbal 36 is attached to the slider 38 at a point beyond the center of rotation 40 in a direction extending away from the load arm 24.

The slider 38 includes a self-acting hydrodynamic air bearing surface which can take the form of multiple rails 44 with tapered forward surfaces 46. The rotating disc 26 forces air into the tapers 46 and produces pressure beneath the rails 44 resulting in the air bearing surface. Each rail 44 also has a bump or protrusion 48 as explained more fully below. A piezoelectric transducer (not shown) generates an electrical signal indicating that the glide head has struck the surface of the rotating disc 10. Electric signals are received from the transducer via small twisted copper wires.

The load arm 34 is compliant in the vertical axis to allow the slider 38 to follow the topology of the disc 26, and is rigid in the in-plane axes for precise positioning of the slider. The load arm 34 also supplies a downward force that counteracts the hydrodynamic lifting force developed by the slider's air bearing.

Figure 6:
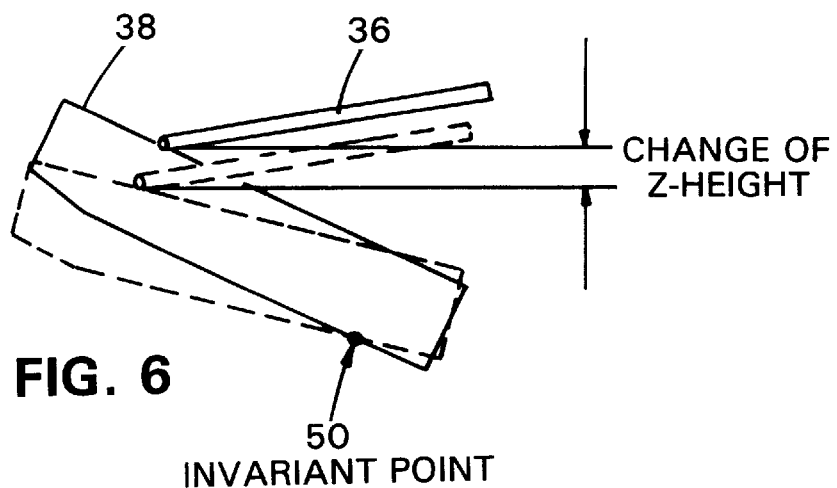

As illustrated by FIG. 6, the air bearing surface of the slider 38 includes fly height invariant points 50, in other words, points on the air bearing surface whose vertical position along the z-axis remains substantially constant even if the "Z" height of the glide head changes.

Figures 7A, 7B:
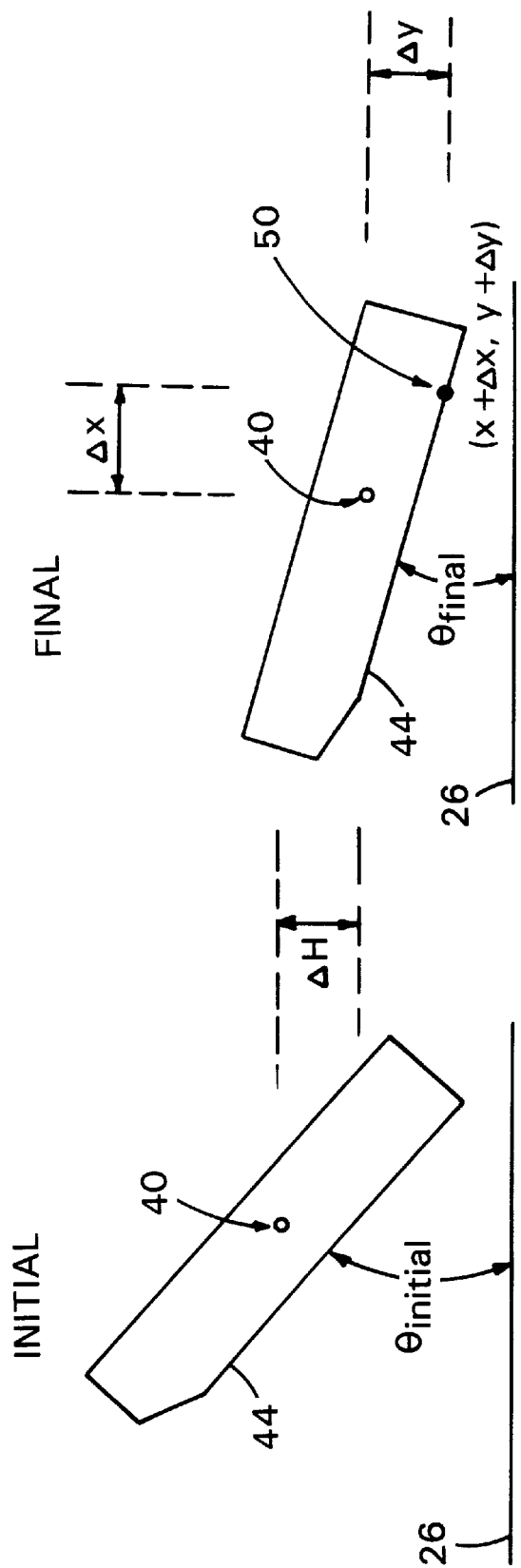

The location of the invariant point(s) 50 can be determined through simulation or experimentation. For example, the vertical displacement ΔH of the slider's center of rotation 40 when the "Z" height changes from an initial value (FIG. 7A) to a final value (FIG. 7B) is determined, and the initial and final angles, $\theta_{initial}$, $\theta_{final}$, between the air bearing surface (or the rails 44) and the surface of the disc 26 before and after the change in the "Z" height are determined. Assuming that the position of the slider's center of rotation after the change in the "Z" height is given as (x, y), then the location of the invariant point 50 is given by (x+Δx, y+Δy), where $$\Delta x = \frac{\Delta H}{\tan(\theta_{initial}) - \tan(\theta_{final})} \text{ and}$$

$$\Delta y = \frac{\Delta H[\tan(\theta_{final})]}{[\tan(\theta_{final}) - \tan(\theta_{initial})]}.$$

Figure 8:
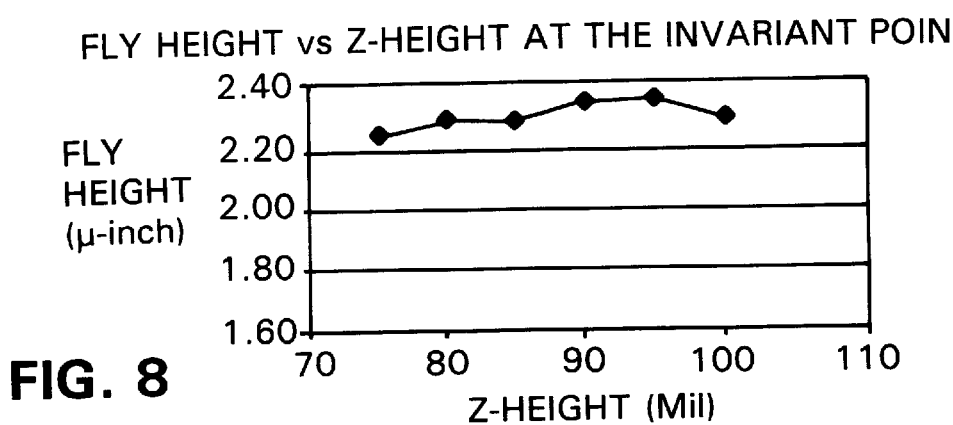

FIG. 8 illustrates the relatively small variation in fly height as measured at the invariant point(s) 50 over a wide range of values for the "Z" height. In the illustrated example, the fly height at the point 50 varies less than 0.2 microinches as the "Z" height varies over a range of about twenty-five mils (0.025 inch).

Each protrusion 48 (FIGS. 4 and 5) is located at a fly height invariant point 50 on the air bearing surface of the glide head 24. Specifically, the protrusions 48 are located on the rails 44 at their respective fly height invariant points 50.

Figure 9:
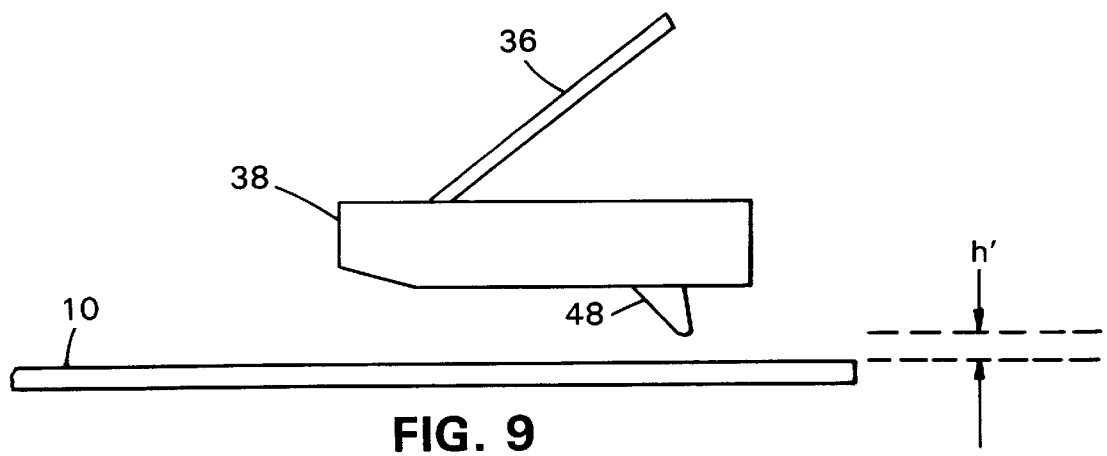
Figure 10:
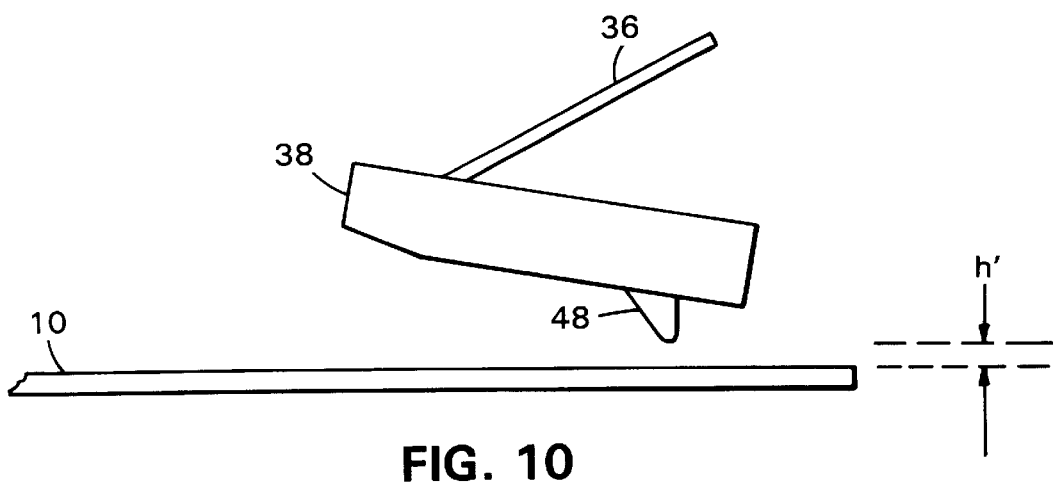

The tip or distal end of each protrusion 48 extends downward to form a lowermost point on the slider 38. In other words, each protrusion 48 should extend closer to the surface of the disc 10 than every other point on the air bearing surface even when the "Z" height varies (see FIGS. 9 and 10). Thus, the fly height h', as measured from the protrusions 48 to the surface of the disc 10, remains approximately constant and is relatively insensitive to changes in the "Z" height of the glide apparatus. Accordingly, any changes in the distance h' will be due primarily to defects, contamination or other characteristics of the disc surface, rather than changes in the "Z" height of the glide apparatus.

The protrusions 48 can be formed, for example, of the same material as either the outer layer or the substrate of the slider 38. In some implementations, the protrusions 48 comprise a diamond-like carbon or a material such as aluminum-titanium-carbide (AlTiC). The protrusions 48 can be formed by various processes, including ion-milling, ereactive ion-milling or laser ablation. Alternatively, a photolithographic technique can be used to form relatively flat protrusions at the fly height invariant point(s) 50. A thin protective carbon outer layer can be provided on the protrusions 48 to increase their durability and to reduce the amount of wear.

Providing protrusions 48 approximately at the fly height invariant points of the air bearing surface of the glide head allows glide tests and glide avalanche tests to be performed more accurately because the disc can be tested while rotating at a higher linear velocity, thus resulting in an improved signal-to-noise ratio. Furthermore, by appropriately selecting the location of the protrusion, the fly height can be made substantially constant and relatively insensitive to changes in the "Z" height. Therefore, even if the mounting base 16 to which the glide head is attached moves slightly, there will be little or no change in the fly height. Similarly, if one glide head is replaced by a second glide head during manufacturer testing, any differences in the respective "Z" heights of the glide heads will have little impact on their respective fly heights, thereby allowing more uniform testing to be performed.

Other implementations are within the scope of the following claims.

What is claimed is:

1. A glide head that can be coupled to a mounting base via a load arm for testing surface characteristics of a magnetic disc, the glide head comprising:

a gimbal; and a slider coupled to the gimbal, wherein the slider includes an air bearing surface including a plurality of rails extending along its lower surface, wherein each rail has a downward protrusion whose distance from a disc under test is substantially insensitive to changes in a height measured from a bottom of the mounting base to an upper surface of the disc.

2. The glide head of claim 1 wherein each protrusion has a distal end extending downward such that a distance from the distal end to the disc under test is less than a distance from every other surface of the slider to the disc during operation of the glide head.

3. The glide head of claim 1 wherein the slider has a center of rotation, and wherein each protrusion is located to one side of the center of rotation and a load point of the gimbal is located to another side of the center of rotation.

4. The glide head of claim 1 wherein each protrusion includes a diamond-like carbon material.

5. The glide head of claim 1 wherein each protrusion includes aluminum-titanium-carbide.

6. The glide head of claim 1 wherein each protrusion includes an outerlayer comprising carbon.

7. The glide head of claim 1 further including a transducer for generating an electric signal when one or more of the protrusions strike a surface of the disc.

8. An apparatus for testing surface characteristics of a magnetic disc comprising:

a mounting base;

a slider including an air bearing surface including a plurality of rails extending along its lower surface, wherein each rail has a downward protrusion whose distance from a disc under test is substantially insensitive to changes in a height measured from a bottom of the mounting base to an upper surface of the disc;

a load arm coupled to the mounting base, wherein the load arm is compliant in a vertical axis to allow the slider to follow a topology of the disc;

a gimbal coupled to the load arm and resiliently supporting the slider; and a transducer for generating an electric signal when one or more of the protrusions strike a surface of the disc.

9. The glide head of claim 8 wherein each protrusion has a distal end extending downward such that a distance from the distal end to the disc under test is less than a distance from every other surface of the slider to the disc during operation of the glide head.

10. A glide head that can be coupled to a mounting base via a load arm for testing surface characteristics of a magnetic disc, the glide head comprising:

a gimbal; and a slider coupled to the gimbal, wherein the slider includes an air bearing surface including a plurality of rails extending along its lower surface, wherein each rail has a downward protrusion such that the glide head has a fly height with respect to a disc under test that is substantially constant.

11. The glide head of claim 10 wherein each protrusion has a distal end extending downward such that a distance from the distal end to the disc under test is less than a distance from every other surface of the slider to the disc during operation of the glide head.

12. The glide head of claim 11 wherein each protrusion includes a diamond-like carbon material.

13. The glide head of claim 11 wherein each protrusion includes aluminum-titanium-carbide.

14. The glide head of claim 11 wherein each protrusion includes an outer layer comprising carbon.

15. The glide head of claim 11 further including a transducer for generating an electric signal when one or more of the protrusions strikes a surface of the disc.

16. A glide head that can be coupled to a mounting base via a load arm for testing surface characteristics of a magnetic disc, the glide head comprising:

a gimbal;

a slider coupled to the gimbal, wherein the slider has an air bearing surface including a plurality of rails extending along its lower surface; and a downward protrusion on a bottom surface of the slider, wherein the protrusion extends below the rails and has a distance from a disc under test that is substantially insensitive to changes in a height measured from a bottom of the mounting base to an upper surface of the disc.

17. The glide head of claim 16 wherein the protrusion has a distal end extending downward such that a distance from the distal end to the disc under test is less than a distance from every other surface of the slider to the disc during operation of the glide head.

* * * * *